(12) United States Patent
Gu et al.

(10) Patent No.: US 8,614,279 B2
(45) Date of Patent: Dec. 24, 2013

(54) PROCESS TO PRODUCE AN ACYLATED VINYLAMINE-CONTAINING POLYMER AND ITS APPLICATION AS A PAPERMAKING ADDITIVE

(75) Inventors: Qu-Ming Gu, Bear, DE (US); Jonathan M. McKay, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 13/446,486

(22) Filed: Apr. 13, 2012

(65) Prior Publication Data

US 2012/0264888 A1    Oct. 18, 2012

Related U.S. Application Data

(60) Provisional application No. 61/475,355, filed on Apr. 14, 2011.

(51) Int. Cl.
*C08F 120/54*    (2006.01)

(52) U.S. Cl.
USPC ................................... 525/328.2

(58) Field of Classification Search
USPC ................................... 525/328.2
See application file for complete search history.

(56) References Cited

U.S. PATENT DOCUMENTS

| | | | |
|---|---|---|---|
| 2,721,140 A | 10/1955 | Weisgerber | |
| 4,275,002 A | 6/1981 | Gless, Jr. et al. | |
| 4,421,602 A | 12/1983 | Brunnmueller et al. | |
| 4,774,285 A | 9/1988 | Pfohl et al. | |
| 5,292,441 A | 3/1994 | Chen et al. | |
| 5,630,907 A | 5/1997 | Nilz et al. | |
| 5,961,782 A | 10/1999 | Luu et al. | |
| 5,994,449 A | 11/1999 | Maslanka | |
| 6,159,340 A | 12/2000 | Niessner et al. | |
| 6,616,807 B1 | 9/2003 | Dyllick-Brenzinger et al. | |
| 6,797,785 B1 | 9/2004 | Hund et al. | |
| 7,902,312 B2 | 3/2011 | Gu et al. | |
| 2006/0260812 A1* | 11/2006 | Eoff et al. | 166/279 |
| 2009/0043051 A1 | 2/2009 | Gu et al. | |
| 2009/0314446 A1 | 12/2009 | Lu et al. | |
| 2010/0193148 A1 | 8/2010 | McKay et al. | |
| 2011/0093006 A1* | 4/2011 | Handley et al. | 606/213 |

FOREIGN PATENT DOCUMENTS

EP    0251182    6/1987

OTHER PUBLICATIONS

International Search Report, PCT/US2012/033544, date Jun. 13, 2012, pp. 3.
Reynolds, D.D. et al, Journal of the American Chemical Society, vol. 69, No. 4, Apr. 19, 1947.
Shier, W.T. et al, Polycations as Prostaglandin Sythesis Inducers. II. Structure-Activity Relationships, Prostaglandins, Butterworth, Stoneham, MA, vol. 31, No. 6, Jun. 1, 1986.

* cited by examiner

*Primary Examiner* — Peter Szekely
(74) *Attorney, Agent, or Firm* — Michael J. Herman; Shaorong Chen; Joanne Rossi

(57) ABSTRACT

A process for producing an acylated vinylamine-containing polymer is disclosed. The acylated vinylamine-containing polymer is produced by reacting a vinylamine-containing polymer with at least one acylating agent.

13 Claims, No Drawings

US 8,614,279 B2

PROCESS TO PRODUCE AN ACYLATED VINYLAMINE-CONTAINING POLYMER AND ITS APPLICATION AS A PAPERMAKING ADDITIVE

This application claims the benefit of U.S. provisional application No. 61/475,355, filed Apr. 14, 2011, the entire contents of which are hereby incorporated by reference.

FIELD OF THE INVENTION

This invention relates to the process of preparing acylated vinylamine-containing polymers through acylation of primary and secondary amines of the vinylamine-containing polymers using an acylating agent such as an acyl anhydride or an acyl chloride. In particular, the present invention relates to the process of preparing acylated poly(vinylamine) derivatives using acetic anhydride or propionic anhydride. Furthermore, the invention relates to uses of the acylated poly(vinylamine) derivatives as dry strength additives, wet strength additives, retention aids, drainage aids, and pitch and stickies control agents in papermaking applications.

BACKGROUND OF THE INVENTION

Poly(vinylamine) has been used in many industrial and pharmaceutical applications. In the papermaking industry, poly(vinylamine) products have been used as dry and wet strength additives to improve paper and paperboard strength and as retention/drainage aids to improve paper productivity. U.S. Pat. No. 2,721,140 originally disclosed the use of poly (vinylamine) molecules as papermaking additives to improve paper wet strength. U.S. Pat. No. 4,421,602 disclosed the partially hydrolyzed polymer of poly(N-vinylformamide) for improving flocculation, fines retention and pulp drainage in papermaking. U.S. Pat. No. 6,159,340 described the use of the partially hydrolyzed poly(vinylamine) products as dry and wet strength additives for paperboard. U.S. Pat. Nos. 6,616,807 and 6,797,785 described a variety of poly(vinylamine) derivatives as drainage aids, flocculants, and retention aids for papermaking. U.S. Pat. No. 5,961,782 disclosed the use of poly(vinylamine) to make crosslinkable creping adhesives.

Poly(vinylamine) is a linear cationic polymer with minimal branching and it contains one amine functional group for every two carbon units. A partially hydrolyzed poly(vinylamine) may contain primary amine, amide and amidine functionalities. Poly(vinylamine) is typically made by solution, free-radical polymerization of N-vinylformamide monomer, followed by base- or acid-catalyzed hydrolysis. U.S. Pat. No. 4,275,002 disclosed a process of preparing poly(vinylamine) using N-vinylacetamide monomer through free-radical polymerization followed by hydrolysis using a mineral acid. U.S. Pat. No. 4,774,285 described the preparation of copolymer of N-vinylformamide and vinyl alcohol. U.S. Pat. No. 5,630,907 disclosed the copolymer of vinylamine and acrylic acid. U.S. Pat. No. 6,797,785 disclosed the preparation of the copolymers of vinylamine with diallyldimethylammonium chloride and vinylamine with acrylamide via reverse emulsion polymerization, and the uses as flocculants and coagulants for papermaking. EP 0251182 described the use of copolymers of vinylamine and acrylonitrile for papermaking as drainage aids, retention aids, and wet end additives to increase paper strength.

U.S. Patent Application No. 20090314446 described a method of preparing low amidine content poly(vinylamine) and the usage of such polymer to increase papermaking retention and drainage rate and enhance paper dry strength, and other applications.

The amine functionalities, either primary amine or amidine, of poly(vinylamine) can react with a variety of compounds having reactive functional groups. Post-polymerization chemical modification of poly(vinylamine) with a compound having functional groups is an alternative approach to produce poly(vinylamine) derivatives with altered or improved chemical, physical and application properties. U.S. Pat. No. 5,292,441 described the use of quaternized poly(vinylamine)s as flocculants for wastewater clarification, where the quaternized poly(vinylamine) was obtained via the reaction of poly(vinylamine) with an alkylating agent, such as methyl chloride, dimethyl sulfate, or benzyl chloride. U.S. Pat. No. 5,994,449 described a resin composition as a reaction product of epihalohydrin with the mixture of a poly(vinylamine-co-vinyl alcohol) and poly (aminoamide), and the use of the resin as creping adhesives.

More recently, U.S. Pat. No. 7,902,312 disclosed various Michael addition adducts of poly(vinylamine), and the uses of these modified poly(vinylamine) as dry strength additives and/or retention/drainage aids for papermaking. U.S. Patent Application Nos. 20090043051 and 20100193148 described numerous modified poly(vinylamine) products prepared by alkylation, acylation and condensation reactions of the poly (vinylamine) with a variety of amine-reactive compounds. In these two patent applications, the amine groups of vinylamine-containing polymers are substituted with cationic, anionic, hydrophobic and hydrophilic functional groups, or the combination of those functional groups. The uses of those modified poly(vinylamine) products are also described for papermaking as dry strength additives, retention and drainage aids, as well as pitch and stickies control agents in the applications, As mentioned in the prior art, a poly(vinylamine) derivative can also be prepared using N-vinylacetamide monomer through free-radical solution polymerization followed by hydrolysis of the acetamide functional group to liberate a free amine group on the polymer backbone and release acetic acid. The disadvantage of the prior art is that it requires a monomer that is expensive and commercially unavailable for industrial production. Additionally, poly(N-vinylacetamide) is more stable than poly(N-vinylformamide) in water and thereby more resistant to hydrolysis.

The present invention is directed to a new process of producing acylated poly(vinylamine), particularly acetylated poly(vinylamine), using a readily available acylating agent, e.g., acyl anhydrides, or acyl chlorides, preferably acetic anhydride, propionic anhydride, acetyl chloride and propionyl chloride. Acylation of a poly(vinylamine) by acetic anhydride or propionic anhydride or acetyl chloride can be completed with high reaction efficiency and without by-products except acetic acid, propionic acid or chloride, respectively.

BRIEF DESCRIPTION OF THE INVENTION

The present invention provides a process for producing acylated vinylamine-containing polymers which comprises a step of reacting an acylating reagent with the vinylamine-containing polymer. Particularly, the process of the present invention provides a process of making an acylated poly (vinylamine) by reacting an acyl anhydride or acyl chloride with a poly(vinylamine) homopolymer.

Acetic anhydride or propionic anhydride can be reacted with poly(vinylamine) at a desired ratio of the acyl anhydride to the amine content of the poly(vinylamine) to produce an acylated poly(vinylamine) polymer. The product has different chemical, physical and application properties as compared to an unmodified poly(vinylamine). In the case of poly(vinylamine) homopolymer, the primary amines of poly(vinylamine) are converted to amide bonds through acylation reaction. When acetic anhydride is used, the acetamide functional group is formed on the backbone of the poly(vinylamine). Unlike the formamide functional groups in a partially hydrolyzed poly(N-vinylformamide) that predominantly exist as cyclized amidine, the acetamide groups in the polymer react much slower with the adjacent primary amine to form the corresponding amidine functionality.

In the process of the present invention, the vinylamine-containing polymer is preferably dissolved in water in an amount in the range of 2 to 50 weight %, preferably in an amount in the range of 5 to 40 weight %, and most preferably in an amount in the range of 8 to 20 weight % based on the total weight of the polymer solution.

The molar ratio of the acylating agent to the amine content of the vinylamine-containing polymer is 1 to 200 mole %, preferably from 5 to about 100 mole %, and most preferably from about 15 to 50 mole %.

The process is preferably carried out at a reaction temperature from about 24° C. to about 80° C., more preferably from about 30° C. to about 50° C., and most preferably from about 35° C. to about 40° C. The process is carried out in a pH range of from about pH 5 to about 12.5; preferably from about pH 6 to about 12; more preferably from about 7 to about 11, and most preferably from about 8 to about 10.

The process is preferably carried out for a period of from about 0.1 to about 4 hours, more preferably from about 0.5 to about 3 hours, and most preferably from about 1 to about 2 hours.

The molecular weight ($M_w$) of the vinylamine-containing polymers used in the present invention is in the range of from 2,000 to 2,000,000 Daltons, preferably from 4,000 to 1,000,000 Daltons, more preferably from 10,000 to 1,000,000 Daltons, and most preferably in the range of from 50,000 to 500,000 Daltons. Accordingly, the acylated vinylamine-containing polymers of the present invention have a molecular weight range of from 3,000 to 2,000,000 Daltons, preferably from 5,000 to 1,000,000 Daltons, more preferably from 12,000 to 1,000,000 Daltons, and most preferably in the range of from 50,000 to 500,000 Daltons.

The acylated vinylamine-containing polymers of the present invention can be used in papermaking as dry strength additives to improve paper and paperboard dry strength, to accelerate drainage of the pulp fiber and to increase the retention of fines and fillers by the pulp fibers in the papermaking process.

The acylated vinylamine-containing polymers of the present invention, when added to the wet end of a paper machine on an equal active polymer basis, provided improved dry strength properties to paperboard products relative to the paperboard products made with unmodified vinylamine-containing polymers. More specifically, acetylated poly(vinylamine) products of the present invention were more effective at the treatment level from 0.01 weight % to about 0.5 weight % based on the weight of the dry pulp relative to the unmodified poly(vinylamine). The products also provided good drainage and retention properties to the pulp fiber.

DESCRIPTION OF THE INVENTION

The present invention is directed to the process for producing acylated vinylamine-containing polymers by reacting at least one acylating reagent with vinylamine-containing polymers wherein the acylating agent is selected from the group consisting of acyl anhydride, acyl halide and mixtures thereof.

The invention provides for a process for producing acylated vinylamine-containing polymer having the steps of a) obtaining an aqueous solution comprising at least one vinylamine-containing polymer, and b) reacting the vinylamine-containing polymer with at least one acylating agent. The preferred acylating agents include acyl anhydride, acyl halide and mixtures thereof.

The process of the present invention is a process that provides advantages over the existing processes for the preparation of acylated vinylamine-containing polymers. This process of the present invention utilizes inexpensive and commercially-available acylating agents to modify a widely available vinylamine-containing polymer to produce acylated vinylamine-containing polymers. This differs from the prior art, which uses an expensive and commercially unavailable monomer that contains the same acyl group to make the polymer via polymerization. The reason that poly(vinylamine) is widely available is because the monomer, N-vinylformamide, is relatively inexpensive and commercially available and that the hydrolysis of the formamide group is much faster than other amide groups that could be used in process. In addition, the process of the present invention produces the acylated vinylamine-containing polymers with a desired level of acyl substitution by applying an appropriate amount of the acylating agent, while in the prior art, it is more difficult to control the ratio via hydrolysis of the acylated vinylamine-containing polymers under the harsh treatment conditions.

The process of the present invention provides a simplified process of preparing acylated vinylamine-containing polymers with high purity. The process has no side reactions and generates no by-product except the related carboxylic acid when an acyl anhydride is used.

The process of the present invention produces an acylated vinylamine-containing polymer comprising the general formulae (I).

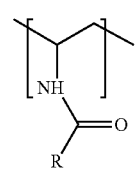

wherein R is preferably an alkyl or aryl group, more preferably —CH$_3$, —CH$_2$CH$_3$ or —CH$_2$CH$_2$CH$_3$, and most preferably —CH$_3$.

Specifically, the process of the present invention provides an acylated vinylamine-containing polymer by reacting at least one acylating agent with primary and/or secondary amines of the vinylamine-containing polymer to form a stable amide functional group on the polymer backbone.

In one embodiment of the invention provides a process to produce an acylated poly(vinylamine) comprising the steps of conducting free radical polymerization of N-vinylformamide in an aqueous solution, subsequently conducting alkaline hydrolysis to form a poly(vinylamine), and reacting the polyvinylamine with an acylating agent.

The acylating agents used in the present invention include acyl anhydride and acyl halides. For purposes of this invention acyl anhydrides do not include cyclic anhydrides. The acylating agent used in the present invention include, but are not limited to, anhydrides such as acetic anhydride, propionic anhydride, butyric anhydride, heptanoic anhydride, benzoic anhydride, phenylacetic anhydride, crotonic anhydride, chloroacetic anhydride, dichloroacetic anhydride and trifloroacetic anhydride; and carboxylic acid chlorides or bromides such as, acetyl chloride, propionyl chloride, butyrl chloride, heptanoyl anhydride, benzoyl chloride, phenylacetyl chloride, crotonyl chloride, chloroacetyl chloride, or mixtures thereof.

More preferably, the acylating agents used in the present invention include, but are not limited to, acetic anhydride, propionic anhydride, acetyl chloride, propionyl chloride, chloroacetyl anhydride, or mixtures thereof.

The vinylamine containing polymer used in the present invention include, but are not limited to, partially or completely hydrolyzed poly(N-vinylformamide); copolymers of N-vinylformamide and vinylamine; copolymers of vinylamine and amidine; copolymers of N-vinylacetamide and vinylamine; terpolymers of N-vinylformamide, vinylamine and amidine; terpolymers of N-vinylformamide, vinylamine and vinylamine methyl chloride quaternary ammonium salts; terpolymers of N-vinylformamide, vinylamine and vinyl alcohol; terpolymers of N-vinylformamide, vinylamine and vinyl acetate; terpolymers of N-vinylformamide, vinylamine and acrylamide; terpolymers of N-vinylformamide, vinylamine and acrylate; terpolymers of N-vinylformamide, vinylamine, and diallyldimethyl ammonium chloride; terpolymers of N-vinylformamide, vinylamine, and vinyl trimethoxysilane; or mixtures thereof.

The vinylamine containing polymers used in the present invention also include alkylated vinylamine-containing polymers produced by reacting a vinylamine-containing polymer with alkylating agents. The alkylating agents containing an amine-reactive functional group include, but are not limited to, methyl chloride, ethyl chloride, propyl chloride, butyl chloride, benzyl chloride, phenylethyl chloride, allyl chloride, 2-(diethylamino)ethyl chloride, 2-(dimethylamino) ethyl chloride, 3-chloro-2-hydroxypropyltrimethylammonium chloride, 3-chloro-2-hydroxypropyl-lauryl-dimethylammonium chloride, 3-chloro-2-hydroxypropyl-cocoalkyl-dimethylammonium chloride, 3-chloro-2-hydroxypropyl-stearyl-dimethylammonium chloride, (4-chloroobutyl)trimethylammonium chloride, (6-chlorohexyl)trimethylammonium chloride, (8-chlorooctyl)trimethylammonium chloride, (glycidylpropyl)trimethylammonium chloride, butyl glycidyl ether, 2-ethylhexyl glycidyl ether, hexadecyl glycidyl ether, C12/C14 glycidyl ethers, chloroacetamide, salts of chloroacetic acid or bromoacetic acid, or mixtures thereof.

The vinylamine containing polymers used in the present invention also include aldehyde-reacted vinylamine-containing polymers produced by reacting a vinylamine-containing polymer with aldehyde-containing compounds. The aldehyde-containing compounds include, but are not limited to, acetaldehyde, propionaldehyde, butylaldehyde, glyoxal, monosaccharide or oligosaccharide that has an aldehyde reducing end (e.g., glucose, maltose, lactose, maltodextrin, corn syrup, enzymatically hydrolyzed starch or guars, chemically hydrolyzed starch or guars, or mixtures thereof).

The vinylamine containing polymers used in the present invention also include amphoteric vinylamine-containing polymers produced by reacting a vinylamine-containing polymer with a cyclic anhydride through a ring opening reaction of the cyclic anhydride. The cyclic anhydrides include, but are not limited to, succinic anhydride, maleic anhydride, glutaric anhydride, 3-methylglutaric anhydride, 2,2-dimethylsuccinic anhydride, cyclic alkyl carboxylic anhydrides, cyclic alkenyl carboxylic anhydrides, alkenyl succinic anhydride (ASA), phthalic anhydride or mixtures thereof.

The vinylamine containing polymers used in the present invention also include Michael adducts of vinylamine-containing polymers produced by reacting a vinylamine-containing polymer with the compounds that have an $\alpha,\beta$-unsaturated bond conjugated to an electron withdrawing group. Such compounds include, but are not limited to, acrylamide, methacrylamide, t-butyl acrylamide, N-alkylacrylamide, N-alkylmethacrylamide, N[3-(propyl)trimethylammonium chloride]acrylamide, N-[3-(propyl)trimethylammonium chloride]methacrylamide, methyl acrylate, alkyl acrylate, methyl methacrylate, alkyl methacrylate, aryl acrylate, aryl methacrylates, [2-(methacryloyloxy)ethyl]-trimethylammonium chloride, N-[3-(dimethylamino)propyl]acrylamide, N-[3-(dimethylamino)propyl]methacrylamide, N-ethylacrylamide, 2-hydroxyethyl acrylate, acrylonitrile, vinylpyridine, 1-vinyl-2-pyrrolidinone, or mixtures thereof.

More preferably, the vinylamine containing polymer used in the present invention include, but are not limited to, partially or completely hydrolyzed poly(N-vinylformamide); copolymers of vinylamine and amidine; terpolymers of N-vinylformamide, vinylamine and amidine; terpolymers of N-vinylformamide, vinylamine and acrylate; terpolymers of N-vinylformamide, vinylamine, and diallyldimethyl ammonium chloride; terpolymers of N-vinylformamide, vinylamine and vinyl alcohol; alkylated vinylamine-containing polymers wherein the alkylating agent is allyl chloride, or alkyl glycidyl ether; monosaccharide- or oligosaccharides-reacted vinylamine-containing polymers; or Michael adducts of a vinylamine-containing polymer.

Active polymer in the solution of a vinylamine-containing polymer of the present invention represents the total weight as a percentage in the solution of all the monomers, acylating agents and other amine-reactive compounds used for making the acylated vinylamine-containing polymer on dry basis. For example, N-vinylformamide is the monomer precursor for poly(vinylamine) and has molecular weight of about 71.1. As an example, a 100 g poly(vinylamine) solution containing a polymer originally made with 7.11 g of N-vinylformamide has 7.11% active polymer. As an example, a 100 g acetylated poly(vinylamine) solution containing a polymer made from 10 g of N-vinylformamide and 4 g of acetic anhydride then will have 14% active polymer.

The amine content of a vinylamine-containing polymer is the amount of vinylamine in the polymer in a certain amount of the product calculated on a molar basis. It can be calculated by multiplying the weight percentage polymer active in solution times the weight percent of N-vinylformamide in the active polymer (based on starting material) times the weight of the product, divided by the molecular weight of N-vinylformamide (MW=71.08). for a homopolymer the weight percent of n-vinylformamide is 100%. For example, using 100 grams of a 15% active polymer solution of a homopolymer the calculation would be (0.15 actives) (100 gm)/71.08. For example, using 100 grams of a 15% active polymer solution of a 50:50 copolymer the calculation would be (0.15 actives) (0.5 portion of vinylformamide in polymer)(100 gm)/71.08. The active polymer of a vinylamine-containing polymer product is defined as the total weight in percentage in the product of all the monomers, modifying agents and other amine-reactive compounds used for making the vinylamine-containing polymer on dry basis. Commercially vinylamine-containing polymers commonly use N-vinylformamide as a starting monomer. If a different starting monomer is used to produce the vinylamine-containing polymer then a similar calculation can be done using the molecular weight of the starting monomer in place of the molecular weight of the N-vinylformamide (71.08).

In the present invention, the molar ratio of the acylating agent to the amine content of the vinylamine-containing polymer may be approximately equal. However, the reaction may be carried out in stoichiometric imbalance. Depending on the desired level of acylation, the molar ratio of an acylating agent to the amine content of the vinylamine-containing polymer is 1 to 200 mole %, preferably from 5 to about 100 mole %, most preferably from about 15 to 50 mole %. Efficiency of the acylating reaction varies with types of the acylating agents and the reaction conditions. When the reaction efficiency is less than 50%, 200 mole % or more of the acylating agent vs. the amine content of the vinylamine-containing polymer may be needed. The reaction efficiency of acetic anhydride or propionic anhydride with a poly(vinylamine) is around 70-98% while the reaction efficiency of acetyl chloride with the same poly(vinylamine) is in the range of 40-80%.

The molecular weight of a vinylamine-containing polymer has little effect on acylation efficiency. Not wishing to be bound by theory, the molecular weight of the acylated vinylamine-containing polymers of the present invention is important for its use as a papermaking additive for strength improvement of paper products. If the molecular weight is too low, the vinylamine-containing polymer may have poor retention on pulp fiber. If the molecular weight is too high, it may tend to flocculate the pulp, which may reduce effectiveness of the polymer as a strength additive. The molecular weight ($M_w$) of the vinylamine-containing polymers used in the present invention is in the range of from 2,000 to 2,000,000 Daltons, preferably from 4,000 to 1,000,000 Daltons, more preferably from 10,000 to 1,000,000 Daltons, most preferably in the range of from 50,000 to 500,000 Daltons.

Accordingly, the acylated vinylamine-containing polymers of the present invention have a molecular weight ranged from 3,000 to 2,000,000 Daltons, preferably from 5,000 to 1,000,000 Daltons, more preferably from 12,000 to 1,000,000 Daltons, most preferably in the range of from 50,000 to 500,000 Daltons.

In the process of the present invention, the weight percentage of the vinylamine-containing polymer in water and the molecular weight of the polymer govern the solution viscosity property. The higher molecular weight of the vinylamine-containing polymer, the higher the viscosity the aqueous polymer solution would be at equal weight percentage of the vinylamine-containing polymer, and thus the more dilute the polymer solution must be in order to be easily pumpable or prevent gelation. High solution viscosity may prevent a homogenous reaction between the acylating agent and the vinylamine-containing polymer due to inefficient mass transfer. The vinylamine-containing polymer used in the present invention is dissolved in water in an amount in the range of from 2 to 50 weight % based on the total weight of the polymer solution, preferably in an amount in the range of from 5 to 40 weight %, and most preferably in an amount in the range of from 8 to 20 weight %. Preferably the weight percentage of a partially or completely hydrolyzed poly(N-vinylformamide) is in the range of 8-20% in water.

Preferably, the vinylamine-containing polymer used in the present invention is dissolved in water in the absence of an organic solvent. However, the vinylamine-containing polymer used in the present process may also be dissolved in a mixture of water with one or more water-miscible organic solvents. Examples of the water miscible solvents include, but not limited to, ethanol, ethylene glycol, glycerol ethanol, isopropranol, formic acid, acetic acid and their sodium or potassium salts.

The process of the present invention is preferably carried out at a reaction temperature from about 10° C. to about 80° C., preferably from about 20° C. to about 50° C. more preferably from about 24° C. to about 50° C., and most preferably from about 35° C. to about 40° C. When the temperature of the acylation reaction is too high, the acylating agent, e.g., acetic anhydride or acetyl chloride, may undergo hydrolysis in water before it reacts with the vinylamine-containing polymer.

One vinylamine-containing polymer is poly(vinylamine) that has typically been made by free radical polymerization of N-vinylformamide monomer followed by a base-hydrolysis by which the primary amine is deprotected and formic acid is liberated. A partially hydrolyzed poly(N-vinylformamide) contains N-vinylformamide, amidine and vinylamine units. These completely and partially hydrolyzed poly(N-vinylformamide) polymers may be directly acylated by the process of the present invention after the polymer solution is adjusted to a proper pH using an acid. The acids used for pH adjustment include, but are not limited to, hydrochloric acid, sulfuric acid, acetic acid and formic acid, or mixtures thereof. However, it should be noted that sulfuric acid may cause precipitation of the acylated vinylamine-containing polymers depending on the degree of the acylation, and that the most preferable acids are hydrochloric acid, acetic acid and formic acid.

The process of the present invention is carried out at pH in the range of from pH 5 to about 12.5; preferably carried out in the range of from about pH 6 to about 12; more preferably in the range of from about 7 to about 11, and most preferably in the range of from about 8 to about 10. At pH 11 or above, an acylating agent, such as acetic anhydride, may be hydrolyzed in water faster than its reaction with the vinylamine-containing polymer. A partially or completely hydrolyzed poly(N-vinylformamide) may not be fully protonated at acidic pH (pH 4.0 or less), due to cationic charge repulsion; therefore, it may still have free primary available for the acylation reaction under acidic condition at pH less than 4. The reaction pH of the process may be controlled by gradually adding an alkali, such as sodium hydroxide solution, to neutralize the carboxylic acid or halide ion liberated during the acylation reaction.

The process of the present invention is preferably carried out from about 0.1 to about 4 hours, more preferably from about 0.5 to about 3 hours, and most preferably from about 1 to about 2 hours. The reaction is usually fast for acylating a vinylamine-containing polymer by an acyl anhydride in water, but it is much faster when an acyl halide is the acylating agent.

In addition to primary amine moieties, partially hydrolyzed poly(N-vinylformamide) and vinylamine copolymers of the present invention typically comprise randomly distributed amidine functional groups. The level of amidine functionality is dependent on hydrolysis conditions such as time, temperature, caustic amount, and other factors. As a result, acylation of a partially hydrolyzed poly(N-vinylformamide) by the present invention with an acylating agent, such as acetic anhydride, may also occur on the nitrogen atoms of the amidine functional groups, resulting in randomly distributed monomer units of acylated amidine.

The process of the present invention can provide acetylated poly(vinylamine) derivatives by reacting acetic anhydride with poly(vinylamine) homopolymer at a certain ratio of acetic anhydride to the amine content of poly(vinylamine). The acetylated poly(vinylamine) derivatives have different chemical, physical and application properties vs. the unmodified poly(vinylamine). The acetylated poly(vinylamine) derivatives of the present invention have a lower Brookfield viscosity than that of the unmodified poly(vinylamine) when compared on an equal active basis. The acetylated poly(vinylamine) derivatives, when used as papermaking additives on equal polymer active weight basis, provided improved dry strength property relative to poly(vinylamine) to the paper and paperboard products made using a paper machine. The acetylated poly(vinylamine) products were effective at the treatment level from 0.01 weight % to about 0.5 weight % based oil the dry pulp. The products also gave good drainage and retention properties to the pulp fiber.

According to U.S. Patent Application No. 20090311444, amidine functionality can adversely affect papermaking retention and drainage and dry strength enhancing performances and low amidine content poly(vinylamine) is preferred. The $^1$H-NMR and $^{13}$C-NMR spectral analyses of the acetylated poly(vinylamine) indicated that acetamide functionality exists as the main functional group in the polymer with a very small amount of the acetamide cyclized to form amidine functionality during the process and storage. Apparently, the acetamide group of the acetylated poly(vinylamine) reacts much slower than the formamide group to form the corresponded amidine. The formamide group on a partially hydrolyzed poly(N-vinylformamide), or a formylated (poly-vinylamine), reacts quickly with the adjacent primary amine to form amidine functionality. At an equal level of acylation, an acetylated poly(vinylamine) would contain less amidine functionality and more primary amine group than that of a partially hydrolyzed poly(N-vinylformamide). Without wishing to be bound by theory, it is believed that decreased amidine content when acetyl groups are present, relative to higher amidine content when formamide are present, results in the observed improved performance.

The acylated vinylamine-containing polymers of the present invention can be used as dry strength additives for paper and paperboard products to accelerate drainage of the pulp fiber and to increase the retention of fines and fillers by the pulp fibers during the papermaking process.

The acylated polymers of the present invention can be also used in a combination with other compositions in order to improve the properties of the polymers. The compositions that may be used in combination with the acylated vinylamine-containing polymers of the present invention can be a cationic, or an anionic, or an amphoteric, or a nonionic synthetic, or a natural polymer. For example, the acylated vinylamine-containing polymers of the present invention can be used together with a cationic starch or an amphoteric starch to improve the strength properties of paper products. The acylated vinylamine-containing polymers of the present invention can also be used in combination with an anionic polymer, such as a polyacrylic acid, a copolymer of acrylamide and acrylic acid, or a carboxylmethyl cellulose; a cationic polymer such as a crosslinked polyamidoamine, a polydiallyldimethylammonium chloride, or a polyamine; to form a polyelectrolyte complex to improve the strength properties of paper products. The acylated vinylamine-containing polymers of the present invention can also be used in combination with polymeric aldehyde-functional compounds, such as glyoxalated polyacrylamides, aldehyde celluloses and aldehyde functional polysaccharides. Individual compositions or any combination of different compositions may be applied together with the acylated vinylamine-containing polymers of the present invention, or may be applied sequentially before or after the application of the polymers of the present invention. Individual compositions may be blended together with the acylated vinylamine-containing polymers of the present invention to form a blended composition prior to use.

The embodiments of the invention are defined in the following Examples. It should be understood that these Examples are given by way of illustration only. Thus various modifications of the present invention in addition to those shown and described herein will be apparent to those skilled in the art from the foregoing description. Although the invention has been described with reference to particular means, materials and embodiments, it is to be understood that the invention is not limited to the particulars disclosed, and extends to all equivalents within the scope of the appended claims.

EXAMPLES

Size exclusion chromatography (SEC) was used to measure molecular weight. The analysis was accomplished using gel permeation columns (CATSEC 4000+1000+300+100) and Waters 515 series chromatographic equipment with a mixture of 1% $NaNO_3$/0.1% trifluoroacetic acid in 50:50 $H_2O$:$CH_3CN$ as the mobile phase. The flow rate was 1.0 mL/min. The detector was a Hewlett Packard 1047A differential refractometer. Column temperature was set at 40° C. and the detector temperature was at 35° C. The number average (Mn) and weight average molecular weight (Mw) of the polymers were calculated relative to the commercially available narrow molecular weight standard poly(2-vinyl pyridine).

The charge densities (Mütek) of the ionized polymers in the present invention were measured at pH 7.0 using a colloid titration method. Charge density (meq/g) is the amount of cationic charge per unit weight, in milliequivalents per gram of product solids. The polymer sample is titrated with potassium polyvinyl sulfate (PVSK) to a 0 mV potential with an autotitrator (Brinkmann Titrino) at a fixed titration rate (0.1 mL/dose, 5 sec) and a Mütek particle charge detector (Model PCD 03, BTG, Muetek Analytic Inc., 2141 Kingston Ct., Marietta, Ga., USA) is used for end point detection.

Brookfield viscosity (BV) was measured using a DV-II Viscometer (Brookfield Viscosity Lab, Middleboro, Mass.). A selected spindle (number 2) was attached to the instrument, which was set for a speed of 30 RPM. The reaction solution is prepared at a specific solid content. The Brookfield viscosity spindle was carefully inserted into the solution so as not to trap any air bubbles and then rotated at the above-mentioned speed for 3 minutes at 24° C. The units are in centipoises (cps).

In all the following examples, a high pH solution of poly(vinylamine) homopolymer was used unless otherwise stated. This poly(vinylamine) solution was obtained after completing the steps of free radical polymerization of N-vinylformamide and base-hydrolysis but prior to the neutralization with hydrochloric acid. This poly(vinylamine) product has 14.9% active polymer with pH around 11.5-12.5.

Example 1

Preparation of Acetylated (24.7 mol %) Poly(vinylamine) at a Controlled pH

A poly(vinylamine) solution (14.9% active polymer, 322.7 g) in a 1 L reaction flask was neutralized to pH 9.0 using 36.5% HCl. Acetic anhydride (Aldrich Chemical Co., 16.9 g, 24.7 mol % based on the amine content of the poly(vinylamine)) was added over 10 minutes with stirring at a temperature in the range of from 30° C. to 40° C. while the pH was maintained at 9.0 using a NaOH solution. The resulting mixture was stirred at a temperature in the range of from 30° C. to 40° C. for 30 minutes and the pH was kept at 9.0 using a NaOH solution. After no further change in the reaction pH, the reactant was cooled to room temperature and the pH was adjusted to 7.5 using 36.5% HCl to give the final clear solution product with total solids of 25.5% and the active polymer of 14.2% as calculated. The charge density was measured to be 6.74 meq/g at pH 7.0. The product is a transparent solution with a Brookfield viscosity of 1429 cps. SEC: $M_w$: 316,000; $M_n$: 4.25.

Example 2

Preparation of Acetylated (24.6 mol %) Poly(vinylamine) Without pH Control

A poly(vinylamine) solution (14.9% active polymer, 600.0 g) in a 2-L reaction flask was neutralized to pH 10.0 using 36.5% HCl. Acetic anhydride (Aldrich Chemical Co., 31.3 g, 24.4 mol % based on the amine content of the poly(vinylamine)) was added over 10 minutes with stirring at a temperature in the range of from 30° C. to 40° C. For this example, the theoretical amine content of the PVAm is 14.9%×600/71.08=1.258 mole; acetic anhydride is 31.3/102.09=0.307 mole; therefore the mole percentage is 0.307/1.258=24.4 mol %. The resulting mixture was stirred at a temperature in the range of from 30° C. to 40° C. for 30 minutes and the pH decreased to 8.0. After no further decrease in the reaction pH, the reactant was cooled down without further pH adjustment to give the final product with total solids of 27.0% and the active polymer of 14.7% as calculated. The charge density measured to be 6.82 meq/g at pH 7.0. The product is a transparent solution and Brookfield viscosity was 1692 cps. SEC: $M_w$: 322,000; $M_w/M_n$: 4.39.

Examples 3 through 15

Examples 3 to Example 15 were prepared as described in Example 2 except that different mol % of acetic anhydride were used in acetylation and that the reaction started at different pH. All the solution products were transparent in appearance.

TABLE I

Preparation of Acetylated Poly(vinylamine) with Different mol % of Acetic Anhydride

| | Acetic anhydride mol %/PVAm amine | Starting pH | Ending pH | Active Solids % | Viscosity cps | CD (meq/g) |
|---|---|---|---|---|---|---|
| Example 3 | 7.7 | 10.5 | 9.0 | 14.6 | 1824 | |
| Example 4 | 14.4 | 10.5 | 8.6 | 11.6 | 565 | 7.65 |
| Example 5 | 20.8 | 10.5 | 8.5 | 11.9 | 540 | |
| Example 6 | 23.2 | 10.5 | 8.3 | 14.6 | 1824 | |
| Example 7 | 24.5 | 11.2 | 9.1 | 14.0 | 1296 | 6.82 |
| Example 8 | 25.8 | 10.5 | 8.1 | 14.9 | 1712 | 6.60 |
| Example 9 | 27.1 | 10.5 | 7.9 | 13.0 | 1504 | |
| Example 10 | 28.5 | 11.2 | 8.9 | 13.3 | 1556 | 6.15 |
| Example 11 | 29.9 | 11.2 | 8.6 | 13.6 | 1624 | |
| Example 12 | 31.3 | 11.2 | 8.5 | 13.7 | 1860 | 5.78 |
| Example 13 | 34.3 | 11.5 | 7.3 | 12.5 | 624 | 5.12 |
| Example 14 | 37.5 | 11.5 | 6.6 | 12.2 | 616 | 4.51 |
| Example 15 | 44.5 | 11.5 | — | 12.8 | 756 | |

Examples 16 through 18

Examples 16 to example 17 were prepared as described in Example 1 except the acetylation was conducted at different temperatures. All the solution products were transparent in appearance.

TABLE II

Preparation of Acetylated Poly(vinylamine) at Different Temperature

| | Acetic anhydride mol % | Starting pH | Process Temperature ° C. | Relative Reaction Efficiency % | Active Solids % | Viscosity cps |
|---|---|---|---|---|---|---|
| Example 16 | 25.8 | 10.0 | 30-40 | 89% | 14.0 | 1550 |
| Example 17 | 25.8 | 10.0 | 20-28 | 92% | 14.2 | 1498 |
| Example 18 | 25.8 | 10.0 | 70-75 | 61% | 14.0 | 1658 |

The relative acylation efficiency can be estimated by determining the amount of acetic acid produced during the reactions for a series of reactions that are conducted with the same mol % of acetic anhydride vs. poly(vinylamine). The efficiency was calculated based on the amount of NaOH that is consumed to maintain the reaction pH at 10.0. The actual reaction efficiency should be higher as the reaction pH shifted to acidic when the primary amine groups of poly(vinylamine) are acetylated, which may result in more NaOH consumed to maintain the reaction pH.

As shown in Table II, under these acetylation conditions, the acetylation efficiency was much higher at a lower temperature (20-28° C.) at 92% than that at a higher temperature (70-75° C.) at 61%.

Example 19

Preparation of Acetylated (26 mol %) Poly(vinylamine) Using Hercobond® 6363

A poly(vinylamine) solution (Hercobond® 6363 paper performance additive, available from Ashland Incorporated, 11.7% active polymer, 165 g, pH 8.0) in a 1 L reaction flask was adjusted to pH 10.5 using a NaOH solution. Acetic anhydride (Aldrich Chemical Co., 7.2 g, 26 mol % based on the amine content of the poly(vinylamine)) was added over 10 minutes at 30° C. with agitation. The resulting mixture was stirred at 40° C. for 30 minutes. After no further change in the pH, the solution was cooled to room temperature and the pH was adjusted to 7.5 using 36.5% HCl to give the final clear solution product with total solids of 23.9% and total active polymer of 12.5%. The charge density was measured to be 6.65 meq/g at pH 7.0. The product is a transparent solution with a Brookfield viscosity of 1168 cps. SEC: $M_w$: 315,000; $M_w/M_n$: 4.33. The reaction efficiency was calculated to be 89.5% using the titration method.

Example 20

Succinic Anhydride Acylated (3 mol %)-Acetylated (26 mol %) Poly(vinylamine)

A poly(vinylamine) solution (14.9% active polymer, 145 g) in a 1-L reaction flask was neutralized to pH 11.0 using 36.5% HCl. Acetic anhydride (Aldrich Chemical Co., 8.1 g, 26 mol % based on the amine content of the poly(vinylamine)) was added to the solution with stirring over 10 minutes followed by addition of succinic anhydride (Aldrich Chemical Co., 1.0 g, 3 mol % based on the amine content of the poly(vinylamine)) over 2 minutes at 30° C.-40° C. The resulting mixture was stirred at a temperature in the range of from 24° C. to 40° C. for 30 minutes. After no further decrease in pH, the solution pH was adjusted to 8.0 using 36.5% HCl to give the final clear solution product with total solids of 27.9% and total active polymer of 15.1%. The charge density was measured 6.42 meq/g at pH 7.0. The product is a transparent solution with a Brookfield viscosity of 1828 cps; SEC: $M_w$: 310,000; $M_w/M_n$: 3.07.

Example 21

Maltodextrin Coupled (0.6 mol %)-Acetylated (20 mol %) Poly(vinylamine)

A poly(vinylamine) solution (14.9% active polymer, 141 g) in a 1-L reaction flask was neutralized to pH 11.0 using 36.5% HCl. A maltodextrin (Maltrin M100, Grain Processing Corp., 3.0 g, 0.6 mol % based on the amine content of the poly(vinylamine)) dissolved in 30 g water was added to the solution with stirring over 10 minutes at 40° C. The resulting mixture was stirred at 40° C. for 10 minutes, and then acetic anhydride (Aldrich Chemical Co., 6.0 g, 20 mol % based on the amine content of the poly(vinylamine)) was added over 10 minutes with stirring. The resulting mixture was stirred at a temperature in the range of from 24° C. to 40° C. for 30 minutes to give the final product at pH 8.0 with total active polymer of 14.1%. The charge density was measured 6.28 meq/g at pH 7.0. The product is a transparent solution with a Brookfield viscosity of 1548 cps. SEC: $M_w$: 352,000; $M_w/M_n$: 3.38.

Example 22

Lactose Coupled (1.2 mol %)-Acetylated (20 mol %) Poly(vinylamine)

A poly(vinylamine) solution (14.9% active polymer, 180 g) in a 1-L reaction flask was neutralized to pH 11.0 using 36.5% HCl. Lactose (Aldrich Chemical Co., 1.5 g, 1.2 mol % based on the amine content of the poly(vinylamine)) dissolved in 10 g water was added to the solution with stirring over 10 minutes at 40° C. The resulting mixture was stirred at 40° C. for 10 minutes, and then acetic anhydride (Aldrich Chemical Co., 7.7 g, 20 mol % based on the amine content of the poly(vinylamine)) was added over 10 minutes with stirring. The resulting mixture was stirred at a temperature in the range of from 24° C. to 40° C. for 30 minutes to give the final product at pH 8.0 with total active polymer of 10.0%. The product is a transparent solution with a Brookfield viscosity of 218 cps.

Example 23

Preparation of Propionylated (20 mol %) Poly(vinylamine)

A poly(vinylamine) solution (14.9% active polymer, 130.0 g) in a 1-L reaction flask was neutralized to pH 10.0 using 36.5% HCl. Propionic anhydride (Aldrich Chemical Co., 7.2 g, 20 mol % based on the amine content of the poly(vinylamine)) was added over 10 minutes with stirring at a temperature in the range of from 30° C. to 40° C. The resulting mixture was stirred at a temperature in the range of from 30° C. to 40° C. for 30 minutes. The pH was adjusted to 7.4 using 36.5% HCl to give the final product with total solids of 21.4% and total active polymer of 11.8%. The product was a little bit hazy and Brookfield viscosity was 1020 cps.

Example 24

Preparation of Acetylated (38 mol %) Poly(vinylamine) Using Acetyl Chloride

A poly(vinylamine) solution (14.9% active polymer, 133.0 g) in a 1 L reaction flask was neutralized to pH 9.0 using 36.5% HCl. Acetyl chloride (Aldrich Chemical Co., 8.3 g, 38 mol % based on the amine content of the poly(vinylamine)) was added dropwise over 20 minutes with stirring at a temperature in the range of from 23° C. to 30° C. The reaction was vigorous and immediate. The resulting mixture was stirred at a temperature in the range of from 23° C. to 35° C. for 30 minutes to give the final product at pH 6.7 with total solids of 24.0% and total active polymer of 13.1%. The product is a transparent solution with a Brookfield viscosity of 1120 cps.

Example 25

Allyl Chloride alkylated (10 mol %)-Acetylated (17 mol %) Poly(vinylamine)

To a poly(vinylamine) solution (14.9% active polymer, 149 g) in a 1-L reaction flask at pH 12.1 was added allyl chloride (Aldrich Chemical Co., 2.5 g, 10 mol % based on the amine content of the poly(vinylamine)) over 5 minutes at 60° C. The resulting mixture was stirred at 60° C. for 2 hours, and then cooled to 40° C. while the pH was adjusted to 11.0 using 36.5% HCl. Acetic anhydride (Aldrich Chemical Co., 5.4 g, 17 mol % based on the amine content of the poly(vinylamine)) was added over 10 minutes with stirring. The resulting mixture was stirred at a temperature in the range of from 24° C. to 40° C. for 50 minutes. The pH was adjusted to 8.0 using 36.5% HCl to give the final product with total active polymer of 14.0%. The solution product was hazy and Brookfield viscosity was 1252 cps. SEC: $M_w$: 308,000; $M_w/M_n$: 4.71.

Example 26

Chloroacetamide Alkylated (3.4 mol %)-Acetylated (22.6 mol %) Poly(vinylamine)

To a poly(vinylamine) solution (14.9% active polymer, 150 g) in a 1-L reaction flask at pH 12.1 was added chloroacetamide (Aldrich Chemical Co., 1.0 g, 3.4 mol % based on the amine content of the poly(vinylamine)) over 5 minutes at 40° C. The resulting mixture was stirred at 40° C. for 30 minutes, and then cooled to 30° C. while the pH was adjusted to 11.0 using 36.5% HCl. Acetic anhydride (Aldrich Chemical Co., 7.25 g, 22.6 mol % based on the amine content of the poly(vinylamine)) was added over 10 minutes with stirring. The resulting mixture was stirred at a temperature in the range of from 24° C. to 40° C. for 40 minutes. The pH was adjusted to 7.75 using 36.5% HCl to give the final product with total active polymer of 13.4%. The product is a transparent solution with a Brookfield viscosity of 1756 cps. SEC: $M_w$: 318,000; $M_w/M_n$: 4.55.

Example 27

(3-Acrylamidopropyl)trimethylammonium Chloride
Alkylated (20 mol %)-Acetylated (10 mol %)
Poly(vinylamine)

A poly(vinylamine) solution (Hercobond® 6363 paper performance additive, available from Ashland Incorporated, 11.7% active polymer, 250 g, pH 8.0) in a 1 L reaction flask was adjusted to pH 11.5 using a 50% NaOH solution (16.9 g). (3-acrylamidopropyl)-trimethylammonium chloride (AP-TAC, 60% solution in water, available from Ashland Incorporated, 21.27 g, 20 mol % based on the amine content of the poly(vinylamine)) was added to the poly(vinylamine) solution, which was subsequently heated to 70° C. The solution was stirred with heating for 3 hours at 70° C., and was then cooled to 50° C. Acetic anhydride (Aldrich Chemical Co., 6.30 g, 10 mol % based on the amine content of the poly(vinylamine)) was added and the solution was stirred at 50° C. for 3 hours longer. The solution was cooled down and the pH was adjusted to 8.3 using 36.5% HCl to give the final clear solution product with total solids of 26.9% and total active polymer of 15.5%. The charge density was measured to be 7.97 meq/g at pH 7.0. The product is a transparent solution with a Brookfield viscosity of 1166 cps. SEC: Mw: 350,000; Mw/Mn: 3.83.

Example 28

(3-Acrylamidopropyl)trimethylammonium Chloride
Alkylated (10 mol %)-Acetylated (15 mol %)
Poly(vinylamine)

A poly(vinylamine) solution (Hercobond® 6363 paper performance additive, available from Ashland Incorporated, 11.7% active polymer, 250 g, pH 8.0) in a 1 L reaction flask was adjusted to pH 11.5 using a 50% NaOH solution (16.5 g). (3-acrylamidopropyl)-trimethylammonium chloride (AP-TAC, 60% solution in water, available from Ashland Incorporated, 28.35 g, 10 mol % based on the amine content of the poly(vinylamine)) was added to the poly(vinylamine) solution, which was subsequently heated to 70° C. The solution was stirred with heating for 3 hours at 70° C., and was then cooled to 50° C. Acetic anhydride (Aldrich Chemical Co., 4.20 g, 15 mol % based on the amine content of the poly(vinylamine)) was added and the solution was stirred at 50° C. for 3 hours longer. The solution was cooled down and the pH was adjusted to 8.3 using 36.5% HCl to give the final clear solution product with total solids of 26.9% and total active polymer of 16.1%. The charge density was measured to be 8.16 meq/g at pH 7.0. The product is a transparent solution with a Brookfield viscosity of 1116 cps.

Example 29

(3-Acrylamidopropyl)trimethylammonium Chloride
Alkylated (15 mol %)-Acetylated (15 mol %)
Poly(vinylamine)

A poly(vinylamine) solution (Hercobond® 6363 paper performance additive, available from Ashland Incorporated, 11.7% active polymer, 250 g, pH 8.0) in a 1 L reaction flask was adjusted to pH 11.5 using a 50% NaOH solution (17.05 g). (3-acrylamidopropyl)-trimethylammonium chloride (AP-TAC, 60% solution in water, available from Ashland Incorporated, 21.27 g, 15 mol % based on the amine content of the poly(vinylamine)) was added to the poly(vinylamine) solution, which was subsequently heated to 70° C. The solution was stirred with heating for 3 hours at 70° C., and was then cooled to 50° C. Acetic anhydride (Aldrich Chemical Co., 4.20 g, 15 mol % based on the amine content of the poly(vinylamine)) was added and the solution was stirred at 50° C. for 3 hours longer. The solution was cooled down and the pH was adjusted to 8.3 using 36.5% HCl to give the final clear solution product with total solids of 26.2% and total active polymer of 15.0%. The charge density was measured to be 8.64 meq/g at pH 7.0. The product is a transparent solution with a Brookfield viscosity of 1022 cps.

Example 30

Approach B:
(3-Acrylamidopropyl)trimethylammonium Chloride
Alkylated (20 mol %)-Acetylated (10 mol %)
Poly(vinylamine)

A poly(vinylamine) solution (Hercobond® 6363 paper performance additive, available from Ashland Incorporated, 11.7% active polymer, 250 g, pH 8.0) in a 1 L reaction flask was adjusted to pH 10.1 using a 50% NaOH solution (12.4 g). Acetic anhydride (Aldrich Chemical Co., 4.20 g, 10 mol % based on the amine content of the poly(vinylamine)) was added and the solution was stirred at 50° C. for 3 hours. The solution was treated with 50% NaOH (4.65 g), followed by (3-acrylamidopropyl)trimethylammonium chloride (AP-TAC, 60% solution in water, available from Ashland Incorporated, 14.18 g, 20 mol % based on the amine content of the poly(vinylamine)). The solution was the heated to 70° C. and stirred for 3 more hours. The solution was cooled to room temperature and the pH was adjusted to 9.1 using 36.5% HCl to give the final clear solution product with total solids of 27.6% and total active polymer of 14.3%. The charge density was measured to be 8.37 meq/g at pH 7.0. The product is a transparent solution with a Brookfield viscosity of 942 cps.

Example 31

Biguanidinylated (5 mol %)-Acetylated (25 mol %)
Poly(vinylamine)

A poly(vinylamine) solution (Hercobond® 6363 paper performance additive, available from Ashland Incorporated, 11.7% active polymer, 250 g, pH 8.0) in a 1 L reaction flask was adjusted to pH 10.1 using a 50% NaOH solution (10.8 g). Acetic anhydride (Aldrich Chemical Co., 10.50 g, 25 mol % based on the amine content of the poly(vinylamine)) was added and the solution was stirred at 50° C. for 3 hours. The solution was treated with 50% NaOH (9.00 g), followed by dicyandiamide (Aldrich Chemical Co., 1.75 g, 5 mol % based on the amine content of the poly(vinylamine)). The solution was the heated to 100° C. and stirred for 3 more hours. The solution was cooled to room temperature and the pH was adjusted to 7.6 using 36.5% HCl to give the final clear solution product with total solids of 25.8% and total active polymer of 14.0%. The charge density was measured to be 7.33 meq/g at pH 7.0. The product is a transparent solution with a Brookfield viscosity of 394 cps.

Example 32

Evaluation as Dry Strength Additives in
Papermaking Applications

The dry strength of papers made with the poly(vinylamine) derivatives of the above examples are compared with the dry strength of paper made with a benchmark dry strength resin poly(vinylamine) (Hercobond® 6363 paper performance additive, available from Hercules Incorporated).

Linerboard paper is made using a papermaking machine. The paper pulp is a 100% recycled medium with 50 ppm hardness, 25 ppm alkalinity, 2.5% GPC D15F and 2000 uS/cm conductivity. The system pH is 7.0 and the pulp freeness is 350-420 CSF with the stock temperature at 52° C. The basis weight is 100 lbs per 3000 ft$^2$. Poly(vinylamine) derivatives prepared in the above examples are added as dry strength agents to the wet end of the papermaking machine at the level of 0.3 weight % of active polymer versus dry paper pulp. Dry tensile strength, Ring Crush and Mullen Burst are used to measure the dry strength effects.

The dry strength test results are shown below in Table III. Performances of the poly(vinylamine) derivatives are expressed as a percentage increase over the dry strength of paper made with Poly(vinylamine) (Hercobond® 6363 paper performance additive, available from Hercules Incorporated).

TABLE III

Dry Strength Performances of Acylated Poly(vinylamine) versus Poly(vinylamine)

| Products | Compositions | Mullen Burst | Ring Crush | Dry Tensile |
|---|---|---|---|---|
| Benchmark | Poly(vinylamine) (Hercobond ® 6363) | 100.0 | 100.0 | 100.0 |
| Example 3 | Acetylated (7.7 mol %) Poly(vinylamine) | 102.4 | 112.4 | 105.4 |
| Example 4 | Acetylated (14.4 mol %) Poly(vinylamine) | 102.1 | 104.8 | 98.5 |
| Example 6 | Acetylated (23.2 mol %) Poly(vinylamine) | 102.9 | 103.5 | 104.2 |
| Example 7 | Acetylated (24.5 mol %) Poly(vinylamine) | 105.7 | 107.4 | 102.8 |
| Example 8 | Acetylated (25.8 mol %) Poly(vinylamine) | 110.4 | 106.6 | 107.2 |
| Example 10 | Acetylated (28.5 mol %) Poly(vinylamine) | 101.2 | 105.6 | 106.3 |
| Example 14 | Acetylated (37.5 mol %) Poly(vinylamine) | 102.4 | 106.6 | 99.2 |
| Example 20 | Succinic anhydride acylated (3 mol %) - Acetylated (26 mol %) Poly(vinylamine) | 103.1 | 101.5 | 104.5 |
| Example 21 | Maltodextrin coupled (0.6 mol % - Acetylated (20 mol %) Poly(vinylamine) | 103.6 | 105.2 | 105.3 |
| Example 23 | Propionylated (20 mol %) Poly(vinylamine) | 112.0 | 110.3 | 104.5 |
| Example 25 | Allyl chloride alkylated (10 mol %) - Acetylated (17 mol %) Poly(vinylamine) | 103.3 | 106.1 | 105.4 |
| Example 26 | 2-Chloroacetamide alkylated (3.4 mol %) - Acetylated (22.6 mol %) Poly(vinylamine) | 100.7 | 106.2 | 104.7 |
| Example 27 | (3-Acrylamidopropyl)trimethyl-ammonium chloride alkylated (20 mol %) - Acetylated (10 mol %) Poly(vinylamine) | 104.1 | 102.2 | 105.0 |
| Example 28 | (3-Acrylamidopropyl)trimethyl-ammonium chloride alkylated (10 mol %) - Acetylated (15 mol %) Poly(vinylamine) | 102.5 | 101.3 | 105.1 |
| Example 29 | (3-Acrylamidopropyl)trimethyl-ammonium chloride alkylated (15 mol %) - Acetylated (15 mol %) Poly(vinylamine) | 103.7 | 100.8 | 103.9 |
| Example 30 | (3-Acrylamidopropyl)trimethyl-ammonium chloride alkylated (20 mol %) - Acetylated (10 mol %) Poly(vinylamine) | 101.0 | 99.8 | 105.0 |
| Example 31 | Biguanidinylated (5 mol %) - Acetylated (25 mol %) Poly(vinylamine) | 102.3 | 98.8 | 101.4 |

Table III compares the representative polymers of the present invention with poly(vinylamine) (Hercobond® 6363). All the acylated poly(vinylamine) derivatives evaluated gave improved Mullen Burst relative to the unmodified poly(vinylamine) (Hercobond® 6363) at an equal active basis. All the acylated poly(vinylamine) derivatives also provided equivalent (within 2%) or better Dry Tensile and Ring Crush compared to the unmodified Hercobond® 6363. For example, the acetylated PVAm (27%) (Example 8) improved Mullen Burst by 10.4%, Ring Crush by 6.6% and dry tensile by 7.2% over the benchmark Hercobond® 6363. It should be also noted that all the acylated poly(vinylamine) derivatives cost less to make compared to unmodified poly(vinylamine) on active basis and have improved cost effectiveness relative to Hercobond® 6363.

The invention claimed is:

1. A process for producing acylated vinylamine-containing polymer comprising the steps of
   a. conducting free radical polymerization of N-vinylformamide in an aqueous solution;
   b. conducting alkaline hydrolysis to form a polyvinylamine; and
   c. reacting the vinylamine-containing polymer with at least one acylating agent,
   wherein the acylating agent is selected from the group consisting of acyl anhydride, acyl halide and mixtures thereof; and
   wherein acylation temperatures are from about 20° C. to about 50° C. and wherein the acyl anhydride is not a cyclic anhydride.

2. The process of claim 1 wherein at least one vinylamine-containing polymer is selected from the groups consisting of partially or completely hydrolyzed poly(N-vinylformamide), copolymers of N-vinylformamide and vinylamine, copolymers of vinylamine and amidine, copolymers of N-vinylacetamide and vinylamine, terpolymers of N-vinylformamide, vinylamine and amidine, terpolymers of N-vinylformamide, vinylamine and vinylamine methyl chloride quaternary ammonium salts, terpolymers of N-vinylformamide, vinylamine and vinyl alcohol, terpolymers of N-vinylformamide, vinylamine and vinyl acetate, terpolymers of N-vinylformamide, vinylamine and acrylamide, terpolymers of N-vinylformamide, vinylamine and acrylate, terpolymers of N-vinylformamide, vinylamine, and diallyldimethyl ammonium chloride, terpolymers of N-vinylformamide, vinylamine, and vinyl trimethoxysilane, modified vinylamine-containing polymers, or mixtures thereof.

3. The process of claim 1 wherein the vinylamine-containing polymer comprises partially or completely hydrolyzed poly(N-vinylformamide).

4. The process of claim 1 wherein the acylating agent comprises acyl anhydride.

5. The process of claim 1 wherein the acylating agent comprises acyl halide.

6. The process of claim 1 wherein the acylating agent is selected from the group consisting of acetic anhydride, propionic anhydride, butyric anhydride, heptanoic anhydride, benzoic anhydride, phenylacetic anhydride, crotonic anhydride, chloroacetic anhydride, dichloroacetic anhydride and trifloroacetic anhydride, heptanoyl anhydride, an acyl halide and mixtures thereof.

7. The process of claim 1 wherein the acylating agent comprises acetic anhydride.

8. The process of claim 1 wherein the acylating agent is selected from the group consisting of an acyl chloride, acyl bromide, acetyl chloride, propionyl chloride, butyryl chloride, benzoyl chloride, phenylacetyl chloride, crotonyl chloride, chloroacetyl chloride and mixtures thereof.

9. The process of claim 1 wherein the acylated vinylamine-containing polymer has a molecular weight in the range of from about 5,000 to about 2,000,000 Daltons.

10. The process of claim 1 wherein the polyvinylamine and the acylating agent are reacted at a pH of between 7 and 11.

11. The process of claim 1 wherein the polyvinylamine and the acylating agent are reacted at a temperature of between 24-50° C.

12. The process of claim 1 wherein the polyvinylamine and the acylating agent are reacted for a period of between 0.1 and 4 hours.

13. The process of claim 1 wherein the polyvinylamine and the acylating agent are reacted at a pH of between 7 and 11 and at a temperature of between 24-50° C.

* * * * *